(12) United States Patent
Seng

(10) Patent No.: US 10,814,278 B2
(45) Date of Patent: Oct. 27, 2020

(54) SELECTIVE CATALYTIC REDUCTION PROCESS AND OFF-LINE REGENERATION OF DEACTIVATED CATALYST OF THE PROCESS

(71) Applicant: SHELL OIL COMPANY, Houston, TX (US)

(72) Inventor: Guido Seng, The Woodlands, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 16/543,107

(22) Filed: Aug. 16, 2019

(65) Prior Publication Data

US 2020/0061539 A1 Feb. 27, 2020

Related U.S. Application Data

(60) Provisional application No. 62/721,247, filed on Aug. 22, 2018.

(51) Int. Cl.
*B01D 53/96* (2006.01)
*B01D 53/86* (2006.01)

(52) U.S. Cl.
CPC ......... *B01D 53/96* (2013.01); *B01D 53/8637* (2013.01); *B01D 53/8696* (2013.01); *B01D 2251/2062* (2013.01); *B01D 2251/2067* (2013.01); *B01D 2255/20723* (2013.01); *B01D 2255/20769* (2013.01); *B01D 2255/20776* (2013.01); *B01D 2255/50* (2013.01); *B01D 2257/302* (2013.01); *B01D 2257/404* (2013.01)

(58) Field of Classification Search
CPC .. B01D 53/56; B01D 53/565; B01D 53/8625; B01D 53/8631; B01D 2257/402; B01D 2257/404; B01D 2258/0283; B01J 38/00; B01J 38/04
See application file for complete search history.

(56) References Cited

U.S. PATENT DOCUMENTS

| | | |
|---|---|---|
| 6,419,889 B1 | 7/2002 | Boxhoorn et al. |
| 8,758,711 B2 | 6/2014 | Yonemura et al. |
| 8,883,106 B2 | 11/2014 | Buschmann et al. |

FOREIGN PATENT DOCUMENTS

| | | | | |
|---|---|---|---|---|
| AU | 2003271449 A1 | * | 4/2004 | ............. F01N 3/106 |
| CN | 102658013 A | | 9/2012 | |
| CN | 203856549 U | | 10/2014 | |
| CN | 105688936 A | | 6/2016 | |
| CN | 107913598 A | | 4/2018 | |
| DE | 43 26 913 A | * | 1/1986 | ......... B01D 53/8625 |
| EP | 1676626 A1 | | 7/2006 | |
| EP | 2687283 A1 | | 1/2014 | |
| EP | 2742990 A1 | | 6/2014 | |
| EP | 3002059 A1 | | 4/2016 | |

(Continued)

OTHER PUBLICATIONS

International Search Report and Written Opinion received for PCT Patent Application No. PCT/US2019/046888, dated Oct. 24, 2019, 10 pages.

(Continued)

*Primary Examiner* — Timothy C Vanoy

(57) ABSTRACT

Presented is a process for the regeneration of a deactivated nitrogen oxide decomposition catalyst used for the selective catalytic reduction of nitrogen oxides contained in a flue gas stream.

20 Claims, 1 Drawing Sheet

(56) References Cited

FOREIGN PATENT DOCUMENTS

| EP | 3002060 A1 | 4/2016 | |
|---|---|---|---|
| JP | H10192657 A | 7/1998 | |
| JP | 2004330132 A | 11/2004 | |
| KR | 101110665 B1 | 2/2012 | |
| KR | 20170059159 A | 5/2017 | |
| WO | WO 2004031546 A2 * | 4/2004 | ........... F01N 3/0814 |
| WO | 2017112615 A1 | 6/2017 | |
| WO | 2017208502 A1 | 12/2017 | |

OTHER PUBLICATIONS

International Search Report and Written Opinion received for PCT Patent Application No. PCT/US2019/046877, dated Nov. 11, 2019, 09 pages.

International Search Report and Written Opinion received for PCT Patent Application No. PCT/US2019/046864, dated Oct. 24, 2019, 10 pages.

Sobolewski et al., "Steag's Long-term Catalyst Operating Experience and Cost", Proceedings of the 2006 Environmental Controls Conference, Jan. 2006, 18 Pages, XP055362117.

* cited by examiner

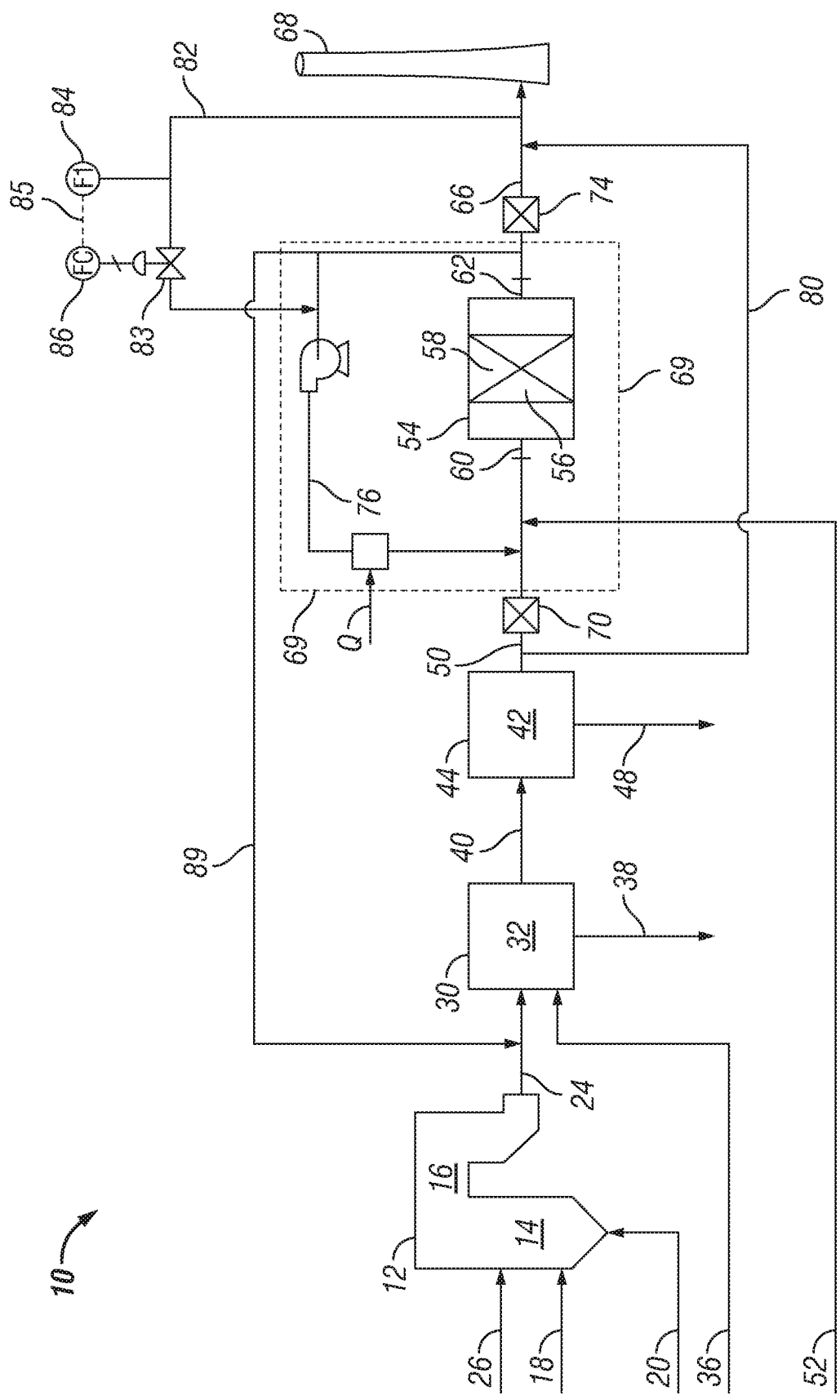

SELECTIVE CATALYTIC REDUCTION PROCESS AND OFF-LINE REGENERATION OF DEACTIVATED CATALYST OF THE PROCESS

The present Non-Provisional application claims the benefit of U.S. Provisional Patent Application Ser. No. 62/721,247 filed Aug. 22, 2018, the entire disclosure of which is hereby incorporated by reference.

FIELD OF THE INVENTION

This invention relates to a catalytic process for the removal of nitrogen oxides and sulfur oxides from a hot process gas stream, having nitrogen oxides and sulfur oxides, and for regenerating a deactivated catalyst of the process.

BACKGROUND OF THE INVENTION

The combustion of a fuel source, such as coal, oil, gas, wood, municipal waste, industrial waste, hospital waste, hazardous waste and agricultural waste, in furnaces or boilers generates hot flue gases that contain combustion products such as carbon monoxide, carbon dioxide, nitrogen oxides, sulfur compounds, and other contaminants. Included among these other contaminants are particulates. The particulates may include fly ash, dust, smoke, and other fine particulate matter that can comprise phosphorous, heavy metals, alkali metals and alkaline earth metals. The nitrogen oxides ($NO_x$) contained in the hot flue gas streams include nitric oxide (NO) and nitrogen dioxide ($NO_2$). The sulfur compounds include the sulfur oxides ($SO_x$) such as sulfur dioxide ($SO_2$) and sulfur trioxide ($SO_3$). The sulfur compounds result from the presence of sulfur in the combustion fuel.

A common method for removing $NO_x$ from the flue gas streams of combustion processes the selective catalytic reduction (SCR) process. This process involves the catalytic reduction of $NO_x$ to nitrogen ($N_2$) and water ($H_2O$) by reaction of $NO_x$ with ammonia ($NH_3$) within a catalyst bed. The primary reactions of the SCR process are presented as follows:

$$4NO + 4NH_3 + O_2 \rightarrow 4N_2 + 6H_2O$$

$$2NO_2 + 4NH_3 + O_2 \rightarrow 3N_2 + 6H_2O$$

$$NO + NO_2 + 2NH_3 \rightarrow 2N_2 + 3H_2O$$

$$6NO_2 + 8NH_3 \rightarrow 7N_2 + 12H_2O$$

The catalyst bed usually includes a catalytically active material, such as a nitrogen oxide decomposition catalyst, also referred to herein as deNOx catalyst, that can comprise a metal oxide and a catalytically active metal component such as titanium, tungsten, molybdenum, vanadium or other suitable compounds known to catalyze the conversion of nitrogen oxides to nitrogen and water. Examples of catalytically active materials are vanadium pentoxide ($V_2O_5$) and tungsten trioxide ($WO_3$).

One problem with the use of the deNOx catalyst of the SCR process in treating combustion flue gas streams is that over time they become contaminated and deactivated by the deposition of particulates and reaction products of ammonia with the sulfur compounds of the hot flue gas stream. These products include, for example, ammonium sulfate and ammonium bisulfate. Other ammonium salts, such as ammonium chloride and ammonium nitrate, formed by the reaction of injected ammonia with components of the flue gas stream, also may deposit on the deNOx catalyst. When the deNOx catalyst becomes deactivated due to deposition of ammonium salts, there is a need to regenerate the catalyst to restore at least a portion of its lost activity.

U.S. Pat. No. 8,883,106 describes one method of regeneration of deNOx catalyst. This patent presents a selective catalytic reduction reactor system for removing nitrogen oxides and sulfur oxides from hot process gas. The reactor system has structural features that provide for an on-line process for regenerating its catalytic elements. This system includes multiple catalyst bed segments arranged in parallel with the flow of the hot process gas that is treated by use of the system. The patent further discloses a method of regenerating the catalyst bed segments. The regeneration method includes isolating one of the catalyst bed segments from the flow of hot process gas and passing a regenerating gas through the isolated catalyst bed segment while the other catalyst bed segments are in simultaneous use to remove nitrogen oxide and sulfur oxide from the hot process gas.

EP 2 687 283 describes another method of regeneration of deNOx catalyst. This publication shows a gas treatment system or facility used for nitrogen oxide removal from a gas stream by catalytic reduction of the nitrogen oxides contained in the gas stream. The gas treatment system includes a reactor system having multiple separate reactors or compartments with catalyst structured to allow for the regeneration of the catalyst of an individual reactor or compartment while using the other reactors or compartments with catalyst in the treatment of the gas stream. The system further includes a dechlorination/desulfurization unit that is located upstream of the reactor system and provides for the treatment of the gas stream. The system also includes a gas treatment circuit and a regeneration circuit. The gas treatment circuit provides for the denitrification of the gas stream by supplying the gas stream to and through the catalyst modules of the reactor system while the regeneration circuit provides for the regeneration of a portion of the catalyst of the reactor system by circulating a regeneration gas through its other catalyst modules. The regeneration off-gas is combined with the gas stream fed to the dichlorination/desulfurization treatment.

Some of the problems with these prior art flue gas catalytic denitrification systems that provide for on-line methods of catalyst regeneration arise from the systems having equipment that is structured with separate reactors or compartments. These separate reactors or compartments are isolated from each other to allow for regeneration of a single reactor or compartment simultaneously with the use of the remaining reactors or compartments in treating the flue gas stream. These regeneration methods require complicated structural features that include separate reactors or compartments as well as valving and switching systems that are expensive and difficult to use and to control.

It is an ongoing desire to provide improved catalytic gas treating systems that are easier to use and require less cost than many of the prior art systems.

SUMMARY OF THE INVENTION

Accordingly, a process is provided for the selective catalytic reduction of nitrogen oxides contained in a gas stream and the regeneration of a deactivated SCR catalyst. This process includes providing a processed flue gas stream, containing nitrogen oxides and sulfur compounds, that is passed to an SCR system having an upstream inlet and a downstream outlet and includes an SCR catalyst. The processed flue gas stream is contacted with the SCR catalyst for a time sufficient to provide a deactivated SCR catalyst deactivated by sulfur compounds. A denitrified flue gas stream is yielded from the SCR system for discharge into a stack. The passing of the processed flue gas stream to the SCR system is then discontinued by isolating the SCR system to provide a closed system, after filing the closed system with processed flue gas, a portion of the processed flue gas stream is introduced at an introduction rate into the closed system as a regeneration gas that is used to regenerate the deactivated SCR catalyst and to yield a regeneration effluent gas containing SOx and ammonia. All or part of the regeneration effluent gas is circulated at a circulating rate from the downstream outlet to the upstream inlet of the SCR system. A portion of the regeneration effluent gas is removed at a removal rate from the closed system while simultaneously introducing a portion of the processed flue gas stream into the closed system.

BRIEF DESCRIPTION OF THE DRAWINGS

The FIGURE is a schematic flow diagram illustrating an embodiment of the inventive process.

DETAIL DESCRIPTION OF THE INVENTION

The invention provides a process for treating combustion flue gases generated by the combustion of a fuel source in a furnace or boiler before passing the combustion flue gases to a flue-gas stack for exhaustion into the outside atmosphere. A typical flue gas stream generated by a furnace or boiler contains nitrogen oxides, sulfur oxides, and particulates that need to be reduced before releasing the flue gas stream into the atmosphere.

A flue gas treating system can include an integrated system of several different types of treating units used to remove different contaminants contained in the flue gas stream. Included among these may be an acid gas removal unit for removing acid gases, such as sulfur oxides ($SO_2$ and $SO_3$) and HCl, from a flue gas stream to provide a desulfurized flue gas stream and a particulates removal unit for removing particulates from the flue gas stream to provide a processed flue gas stream.

The processed flue gas stream contains nitrogen oxides formed by the combustion in the furnace or boiler of the fuel source and are released with the combustion flue gas stream. The processed flue gas stream, thus, comprises nitrogen oxides, such as $N_2O$, NO, $NO_2$ and any combination thereof, and unremoved sulfur oxides and particulates. The processed flue gas stream may be passed to a selective catalytic reduction (SCR) system that provides means for removing nitrogen oxides by the catalyzed reduction of $NO_x$ to $N_2$ and water by the reaction $NO_x$ with injected ammonia or urea within a bed of deNO$_x$ catalyst.

The flue gas treating system may also include treatment of the combustion flue gases by selective non-catalytic reduction of the nitrogen oxides. This is done upstream from the SCR system and includes introducing either ammonia or urea into the boiler at a location where the temperature of the hot flue gas is in the range of from 760° C. (1400° F.) to 1090° C. (1994° F.). At these temperatures, urea decomposes to ammonia and the nitrogen oxides react with ammonia and oxygen to form molecular nitrogen and water. The efficiency of the selective non-catalytic reduction is typically low and may be in the range of from 5% to 50% conversion of the nitrogen oxides contained in the hot flue gas.

Whether the hot flue gas stream that is discharged from the boiler is treated by selective non-catalytic reduction, or not treated by selective non-catalytic reduction, the hot flue gas stream contains concentrations of combustion products that include nitrogen oxides, sulfur compounds, and other contaminants. The concentration of the nitrogen oxides in the hot flue gas stream can be in the range of from 50 ppmw to 5,000 ppmw. More typically, however, the nitrogen oxides concentration in the hot flue gas stream is in the range of from 75 ppmw to 2,000 ppmw. The hot flue gas stream can have a concentration of sulfur compounds in the range of from 1 ppmw to 2,000 ppmw, more typically, from 35 ppmw to 350 ppmw. The amount of particulates material contained in the hot flue gas stream generally is in the range of from 0 mg/m$^3$ to 30,000 mg/m$^3$ of the flue gas stream, but, more typically, from 5,000 mg/m$^3$ to 20,000 mg/m$^3$, at standard pressure and temperature conditions.

The hot flue gas stream, comprising at least one acid gas component such as sulfur dioxide and sulfur trioxide ($SO_2$ and $SO_3$), passes from the furnace or boiler and to an acid gas removal unit or system for treating the flue gas stream to remove at least a portion of its acid gas components. The acid gas removal unit of the process, thus, provides means or method for removing from the flue gas stream at least a portion of the acid gas components contained in the flue gas stream.

Any suitable acid gas removal unit known to those skilled in the art may be used to accomplish the removal of acid gas components from the flue gas stream. Common methods for removing acid gas, particularly, sulfur dioxide and sulfur trioxide as well as other acid gas components like hydrogen chloride, from the flue gas stream are by wet scrubbing and dry or semi-dry processes. These processes use either a dry alkaline sorbent or a solution of alkaline sorbent or a slurry of a solid alkaline sorbent to remove the sulfur dioxide, trioxide and other acid gas components from the flue gas stream. A suitable alkaline sorbent of the treatment slurry or solution can be selected from the group of alkaline sorbents consisting of calcium carbonate ($CaCO_3$, limestone), calcium hydroxide ($Ca(OH)_2$ hydrated lime), magnesium hydroxide ($Mg(OH)_2$), and caustic soda (NaOH).

In the wet scrubbing and semi-dry treatment methods for removing acid gases, the flue gas stream is contacted with a slurry or solution of the alkaline sorbent under suitable conditions for removing sulfur from the flue gas stream. Typically, the method uses a vessel that defines a contacting zone within which the sorbent slurry or solution is sprayed concurrently, counter-currently, or cross-currently with the flow of the flue gas stream introduced into the contacting zone of the vessel. The sulfur in the flue gas stream reacts with the alkaline sorbent which removes at least a portion of the sulfur content in the flue gas stream to yield a desulfurized flue gas stream.

Another suitable method for removing acid gases from the flue gas stream includes the so-called dry method. In the suitable dry treatment methods of the invention, an alkaline material such as sodium bicarbonate ($NaHCO_3$), in powder form, is brought into contact with the flue gas stream within a contacting zone defined by a vessel or any other suitable contacting means. The acid gases of the flue gas stream react with the alkaline material within the contacting zone of the vessel to form solid salts that are removed from the contacting zone.

The amount of $SO_2$ contained in the flue gas stream that is removed by the acid gas removal unit can be in the range upwardly to 85%, or up to 95%, or even up to greater than 95% or 99% of the $SO_2$ contained in the flue gas stream.

Typically, the amount of $SO_2$ removed from the flue gas stream can be in the range of from 10% to 80%, and, more typically, the $SO_2$ removal is in the range of from 30 to 75%.

While wet acid gas removal systems require a particulate removal system upstream, semi-dry and dry systems do not require a particulate removal system upstream but would have it installed downstream of the acid gas removal unit. In either case, the flue gas stream passes to a particulate removal unit or system for removing at least a portion of the particulates material contained in the flue gas stream. The particulate removal unit is a filtration device that provides means and method for removing particles from the flue gas stream to yield the processed flue gas stream that passes to the SCR system. The SCR would is installed downstream of both the particulate removal unit and the acid gas removal unit.

Any suitable particulates removal system known to those skilled in the art is used to accomplish the removal of the particulates material from the flue gas stream. Thus, the particulates material is removed by any suitable particulates removal means or method. Typical systems, however, include electrostatic precipitators and baghouse filter systems. The electrostatic precipitators remove the particles from the flue gas stream by the application of electrostatic force to separate the particles contained in the flue gas stream. The baghouse filter systems remove the particulates using woven or felted fabric materials as a filter medium.

The particulates contained in the flue gas stream are predominantly in a size range of from 0.5 microns ($\mu$m) to 300 microns ($\mu$m) with greater than 70 wt. % of the particles, and, more particularly, from 70 to 98 wt. % of the particles, having a particle size within the range of from 0.5 $\mu$m to 300 $\mu$m. The baghouse filter systems can remove upwardly to or greater than 99% of the particulates contained in the flue gas stream to provide the processed flue gas stream of the flue gas treating process. Typically, the percentage of particulates removed from the flue gas stream is in the range of from 80% to 99.9% of the particulates to provide the processed flue gas stream ready for processing by a selective catalytic reduction (SCR) system.

The inventive process not only includes the selective catalytic reduction of nitrogen oxides contained in a processed flue gas stream by use of an SCR system, but it further includes a novel method of regenerating the deactivated deNOx catalyst, i.e., the SCR catalyst, of the SCR system of the flue gas treating process. The SCR system is a component of the integrated system of treating units, including the acid gas removal unit and the particulates removal unit, for processing a flue gas stream before its release into the atmosphere.

The SCR catalyst of the SCR system can be any deNOx catalyst or catalyst system, known to those skilled in the art, which catalyzes the reduction of nitrogen oxide compounds contained in the flue gas stream to molecular nitrogen and water by the reaction of the nitrogen oxide compounds with ammonia. The SCR system includes an SCR catalyst that is selected from a variety of deNOx catalyst compositions having any suitable structural form or shape.

The SCR catalyst, or deNOx catalyst, can comprise a base metal catalyst, which typically includes titanium oxide or vanadium oxide as a carrier. The carrier may further include another metal oxide. The carrier also may have any suitable shape or structure such as a honeycomb structure, or a ceramic metal or foam structure, or it is an agglomerate, such as an extrudate, a pill, and a ball. The deNOx catalyst can further comprise one or more active metal components selected from the group of metals consisting of vanadium, tungsten, and molybdenum. Other deNOx catalyst compositions can be zeolite-based that typically is used in high-temperature applications, and the deNOx catalyst composition may be a precious metal catalyst for use in low-temperature applications.

U.S. Pat. No. 6,419,889 discloses suitable deNOx catalyst compositions that are useful as the SCR catalyst of the inventive process. This patent is incorporated herein by reference. It describes a titania extrudate particle impregnated with one or more active deNOx metals such as vanadium, molybdenum, and tungsten that may suitably be used as the SCR catalyst of the invention.

Examples of suitable ceramic or metallic foam deNOx catalysts that are useful as the SCR catalyst of the inventive process include those described in WO 2017/112615. This publication is incorporated herein by reference. The ceramic foam is made by filling the pores of a foamed polymer with aqueous slurry of a ceramic material and drying and calcining the wet foam so that the polymer vaporizes or is burned. The metallic foam is made by a powder metallurgical process that converts a nickel or iron foam into a high-temperature alloy. Incorporated onto the ceramic or metal foam is a suitable active deNOx metal as described herein.

U.S. Pat. No. 8,758,711 gives examples of suitable honeycomb structures and deNOx catalyst compositions. This patent is incorporated herein by reference. These catalysts comprise a carrier, having a honeycomb structure with a plurality of through holes providing a reaction flow path. The carrier may further comprise an oxide compound of one or more elements selected from the group consisting of Si, B, P, Zr, and W. Incorporated into the honeycomb structured carrier is an active deNOx metal selected from the group consisting of $V_2O_5$, $WO_3$, and $MoO_3$.

The SCR system is any system that can be integrated into the flue gas processing system and is capable of functioning as described herein. The SCR system receives the processed flue gas stream, comprising nitrogen oxides and sulfur compounds, that passes from the particulates removal unit. The SCR system provides means and method for removing the nitrogen oxides from the processed flue gas stream to yield a denitrified flue gas stream that preferably is discharged into a stack.

The SCR system has an upstream inlet for receiving the processed flue gas stream and a downstream outlet for discharging the denitrified flue gas stream. The SCR system defines a contacting zone that contains a deNOx catalyst as described above. Ammonia or urea is introduced into and mixed with the processed flue gas stream that passes to and is introduced into the contacting zone of the SCR system wherein it is contacted with the SCR catalyst under nitrogen oxide reduction, i.e., deNOx, reaction conditions providing for the catalytic reduction of the nitrogen oxides of the processed flue gas stream to nitrogen and water.

Suitable deNOx reaction conditions include a reaction pressure in the range of from −10 kPa (gauge) to 2000 kPa (gauge) and a reaction or contacting temperature in the range of from 130° C. to 450° C. In the normal operation of the SCR system for removal or reduction of NOx contained in the processed flue gas stream, the space velocity is in the range of from 3,000 $hr^{-1}$ to 100,000 $hr^{-1}$, more typically, from 3,000 $hr^{-1}$ to 50,000 $hr^{-1}$, and most typically, from 5,000 $hr^{-1}$ to 20,000 $hr^{-1}$.

The SCR system is operated as a part of the inventive process, which includes passing the processed flue gas stream to the SCR system and introducing it into the contacting zone of the SCR system through the upstream inlet. The denitrified flue gas, having a reduced nitrogen oxides concentration as compared to the processed flue gas stream, is yielded from the SCR system through the downstream outlet of the SCR system and discharged into a stack and to the atmosphere. The processed flue gas stream is contacted with the SCR catalyst for a time that is sufficient to provide a deactivated SCR catalyst. The SCR catalyst becomes deactivated by sulfur compounds through the mechanism described above.

A typical contacting time for deactivation of the SCR catalyst is in the range of from 1 to 16,000 hours, more typically, the contacting time is in the range of from 200 to 8,000 hours. These deactivation times are for the typical space velocities required for treating the processed flue gas stream.

Once the SCR catalyst becomes deactivated to a level that it is no longer removing nitrogen oxides from the processed flue gas stream to an acceptable or desirable level, passing of the processed flue gas stream to the SCR system is stopped or discontinued by isolating the SCR system to provide a closed system. The deactivated SCR catalyst of the isolated SCR system then undergoes regeneration.

The SCR system is isolated by any suitable means or method known to those skilled in the art. Preferably, this is done by blocking-off gas flow in the conduit providing gas communication between the upstream inlet of the SCR system and other treatment units of the flue gas processing system and by blocking-off gas flow in the conduit providing gas communication between the downstream outlet of the SCR system and the stack of the flue gas processing system. An upstream damper or valve means provides for blocking or stopping the flow of the processed flue gas stream to the SCR system and a downstream damper or valve means provides for blocking or stopping the flow of the denitrified gas stream from the SCR system to the stack or atmosphere.

In one embodiment of the inventive process, the regeneration of the deactivated SCR catalyst includes by-passing the processed flue gas stream around the closed system, made by the isolation of the SCR system, as a by-pass stream to the stack of the flue gas processing system. This is one advantage of the inventive process that it provides for the regeneration of the SCR catalyst without the need to shutdown the operation of the furnace or boiler and other elements of the flue gas processing system. The deactivated SCR catalyst then may undergo a regeneration while the processed flue gas stream simultaneously passes to the stack.

To regenerate the deactivated SCR catalyst, the closed system is initially filled with a regeneration gas taken from the processed flue gas stream. The regeneration gas is circulated at a circulation rate through the closed system and passed over the deactivated SCR catalyst to provide for the regeneration of the deactivated SCR catalyst and to yield a regeneration effluent gas that contains SOx and ammonia, which are regeneration products driven from the deactivated SCR catalyst.

In order to remove the regeneration products from the circulating regeneration effluent gas of the closed system, a portion of the circulating regeneration effluent gas is removed from the closed system as a bleed or slip stream while simultaneously introducing into the closed system as fresh regeneration gas a portion of the processed flue gas stream that is by-passing the closed system.

One advantage of the inventive method for regenerating a deactivated SCR catalyst is that it provides an energy efficient regeneration method requiring less energy usage than many other methods of regeneration. While the temperature of the regeneration gas required for the regeneration of the deactivated SCR catalyst is higher than the processed flue gas stream of the SCR system, because the regeneration gas is circulated within the closed system, a minimal amount of incremental heat input (Q) is required to maintain the regeneration temperature of the circulating gas. The required incremental heat input approaches that which is needed to increase the temperature of the portion of processed flue gas stream introduced into the closed system to the temperature of the circulating regeneration gas within the closed system and to compensate for heat losses.

In a preferred embodiment of the inventive regeneration method, a portion of the processed flue gas stream is continuously introduced or fed as regeneration gas into the closed system. This regeneration gas is introduced into the SCR system through its upstream inlet and is passed over the deactivated SCR catalyst to provide for its regeneration. A regeneration effluent gas, comprising the regeneration products of SOx and ammonia, passes from the SCR system by way of its downstream outlet and is circulated at a circulation rate through the closed system from the downstream outlet to the upstream inlet.

In order to remove the regeneration products from the circulating regeneration effluent gas, a portion of the regeneration effluent gas is removed from the closed system at a removal rate sufficient to continuously remove regeneration products from the circulating regeneration effluent gas of the closed system. It is preferred to pass the withdrawn regeneration effluent gas as a recycle stream and feed component to the acid gas removal unit. In this case, the withdrawn regeneration effluent gas passes from the closed system to the acid gas removal unit and is introduced as a feed along with the flue gas stream that is charged to the acid gas removal unit.

It is preferred to control the amount of processed flue gas stream that is continuously introduced or fed into the closed system by flow control and to control the removal rate of the circulating regeneration effluent gas also by flow control provided that the removal rate is sufficient to continuously remove regeneration products but not too high to exceed to capacity of the acid gas removal system it is fed into. But any suitable means or method may be used to control the feed or introduction rate of processed flue gas into the closed system and the removal rate of regeneration effluent gas from the closed system.

As earlier mentioned, the regeneration temperature of the circulating regeneration effluent gas is maintained at a temperature that is higher than the temperature of the processed flue gas stream that is introduced into the closed system. The regeneration temperature needs to be greater than 220° C., and, typically, it is in the range of from 220° C. to 500° C., preferably, from 275° C. to 400° C. Heat energy (Q) is introduced, by direct or indirect heat exchange with a heat source, into the circulating regeneration gas to maintain or control the regeneration temperature.

The inventive process provides for a reduced volume of processed flue gas that is passed over the deactivated SCR catalyst to restore catalytic activity compared to, for example, once-through methods of regeneration. To increase the space velocity and improve the regeneration efficiency of the inventive process, part of all of the regeneration gas is recirculated through the deactivated SCR catalyst instead of applying the conventional method of using fresh processed flue gas as a once-through or single-pass regeneration gas. The combination of a reduction in the volumetric flow of fresh processed flue gas required that is passed over the deactivated SCR catalyst and recirculation of regeneration gas reduces the energy required compared to once-through or single pas regeneration.

Thus, the space velocity through the SCR system of the circulating regeneration effluent gas should be less than the typical space velocities of the processed flue gas stream during the use of the SCR system for deNOx treatment. The regeneration space velocity of the circulating regeneration effluent gas, thus, should be less than 3,000 $hr^{-1}$, and, preferably, it is less than 2,500 $hr^{-1}$, and even less than 2,000 $hr^{-1}$. The regeneration space velocity, therefore, typically is in the range of from 10 $hr^1$ to 3,000 $hr^{-1}$, or of from 10 $hr^{-1}$ to 2,500 $hr^{-1}$ or 2,000 $hr^{-1}$. The regeneration pressure within the closed system can be in the range of from −10 kPa to 2,000 kPa.

The regeneration gas is circulated through the closed system for a circulation time that is sufficient to regenerate the deactivated SCR catalyst by restoring at least a portion of its reduced activity. The circulation time can be in the range of from 10 hours to 240 hours. More typically, the circulation time is in the range of from 20 hours to 100 hours.

Once a sufficient amount of activity is restored to the deactivated SCR catalyst, the regeneration is stopped by discontinuing the introduction of the processed flue gas into the closed system and removal of the regeneration effluent gas from the closed system. The closed system is then re-opened and the processed flue gas stream is again passed to the SCR system to be treated for the removal of nitrogen oxides to yield the denitrified flue gas stream.

The FIGURE presents a process flow diagram showing an embodiment of the inventive process system 10 that provides for treatment of combustion flue gases generated by furnace or boiler 12. Furnace 12 defines combustion zone 14 and heat transfer zone 16 and provides means for burning or combusting a fuel source. The fuel source is introduced into combustion zone 14 through line 18 and combustion air is introduced through line 20. The combustion generates a hot flue gas stream that is discharged and passes from furnace 12 through line 24. The flue gas stream includes nitrogen oxides, sulfur oxides, and particulates.

The combustion flue gas may be treated in furnace 12 for the removal of nitrogen oxides by the application of a selective non-catalytic reduction reaction within furnace 12. To accomplish this, ammonia or urea is introduced through line 26 into either combustion zone 14 or heat transfer zone 16 at a location where the temperature of the hot flue gas is in the range of from 760° C. to 1,000° C.

The flue gas stream passing through line 24 is introduced into acid gas removal unit 30. In this embodiment of the inventive process, acid gas removal unit 30 first processes the hot flue gas to yield the desulfurized flue gas stream before further processing to remove particulates from the desulfurized flue gas stream. In an alternative embodiment of the inventive process, the order of flue gas treatment is reversed with the hot flue gas first being treated by a particulates removal unit to remove particulates and to provide a cleaned gas stream that is treated by an acid gas removal unit to provide a desulfurized flue gas stream or a processed flue gas stream. In the instant embodiment, acid gas removal unit 30 is of the type known in the art as a dry or semi-dry acid gas removal system, which may use a sorbent injection in dry or slurry form. The application of this type of treatment system yields a desulfurized gas stream with no or a minimal amount of added moisture to the flue gas except that which may be introduced by evaporation from the alkaline sorbent slurry. In the alternative embodiment, the type of acid gas removal unit is a wet scrubber that yields a saturated desulfurized flue gas stream that passes from the acid gas removal unit at its dew point.

Acid gas removal unit 30 defines acid gas removal zone 32 within which the flue gas stream is contacted with a slurry or dry powder of an alkaline sorbent. Acid gas removal unit 30 provides means for contacting the slurry or dry powder of alkaline sorbent that is introduced into acid gas removal zone 32 by way of line 36 with the flue gas stream of line 24 that comprises acid gases. Reaction products of the alkaline sorbent with the acid gases pass from acid gas removal unit 30 through line 38 for further processing or disposal. The portion of reaction products not recovered by acid gas removal unit 30 may pass with the desulfurized gas stream to particulates removal unit 44.

The treatment of the flue gas stream by acid gas removal unit 30 yields a desulfurized flue gas stream that passes from acid gas removal unit 30 by way of line 40 and is introduced into particulates removal zone 42 defined by particulates removal unit 44. Particulates removal unit 44 provides means for removing particulates, including the reaction products from the acid gas removal unit 30, from the desulfurized flue gas stream to yield a processed flue gas stream having a reduced particulates concentration. The removed particulates reaction products from acid gas removal unit 30 pass from particulates removal unit 44 by way of line 48.

The processed flue gas stream passes from particulates removal unit 44 through conduit 50 into which ammonia is introduced by way of line 52 to be mixed with the processed flue gas stream prior to passing the mixture to SCR system 54. SCR system 54 provides means for the catalytic reduction of the nitrogen oxides contained in the processed flue gas stream to molecular nitrogen and water.

SCR system 54 includes structure that defines contacting zone 56, which includes deNOx catalyst 58. The deNOx catalyst 58 may be contained within modules that in combination with other structural elements of SCR system 54 direct or provide for the flow of the processed flue gas stream across deNOx catalyst 58 and provides for contacting of the processed flue gas stream with deNOx catalyst 58.

SCR system 54 has upstream inlet 60 for receiving a feed gas, such as the processed flue gas stream that comprises nitrogen oxide compounds, and downstream outlet 62 for discharging and yielding from SCR system 54 a treated process stream, such as a treated processed flue gas stream or denitrified flue gas stream.

In the process, the processed flue gas stream is introduced into contacting zone 56 wherein it is contacted with deNOx catalyst 58 under suitable deNOx reaction conditions to yield a denitrified flue gas stream. The denitrified flue gas stream passes from contacting zone 56 through conduit 66 to stack 68.

The processed flue gas is contacted with deNOx catalyst 58 for a sufficient contacting time to provide for a deactivated SCR catalyst 58 that is deactivated by sulfur compounds. Once deNOx catalyst 58 is sufficiently deactivated, charging of the processed flue gas stream to SCR system 54 is stopped and SCR system 54 is isolated to provide isolated or closed system 69.

To isolate SCR system 54, upstream damper or valve means 70 is interposed into conduit 50 at a location between the outlet of particulates removal unit 44 and upstream inlet 60 of SCR system 54, and downstream damper or valve means 74 is interposed into conduit 66 at a location between downstream outlet 62 of SCR system 54 and stack 68. Both upstream damper 70 and downstream damper 74 are closed to block-off gas flow communication to and from SCR system 54 and to provide for closed system 69. Circulating line 76 provides for fluid communication from downstream outlet 62 to upstream inlet 60 to allow circulating flow within closed system 69.

By-pass line 80 provides for flow of the processed flue gas stream passing from particulates removal unit 44 to by-pass SCR system 54 and closed system 69. By-pass line 80 provides gas flow communication from conduit 50 at a location between the outlet of particulates removal unit 44 and the inlet of upstream damper 70 to conduit 66 at a location between the outlet of downstream damper 74 and stack 68. When SCR system 54 is isolated by closing both upstream damper 70 and downstream damper 74, the processed flue gas stream passes from particulates removal unit 44 and by-passes SCR system 54 and closed system 69 by way of line 80 to conduit 66 and stack 68.

The regeneration of deactivated SCR catalyst 58 includes filling closed system 69 with processed flue gas, which works as a regeneration gas used to regenerate the deactivated deNOx catalyst 58. Line 82 provides fluid flow communication from conduit 66 to circulating line 76 of closed system 69. The processed flue gas is introduced into closed system 69 through line 82 for use as a regeneration gas.

Interposed within line 82 is control valve 83 that provides means for controlling the rate at which the processed flue gas is introduced into closed system 69. The rate of flow of the processed flue gas introduced into circulating line 76 of closed system 69 is measured by flow sensor and transmitter means 84. Flow transmitter means 84 provides signal 85 to flow controller 86 that is representative of the rate of flow of processed flue gas passing through line 82. Flow controller 86 compares this measured flow rate against a desired flow rate to thereby provide a differential flow rate. Flow controller 86 adjusts control valve 83 in response to the differential flow rate to maintain the rate of flow of processed flue gas passing through line 82 and introduced into circulating line 76 of closed system 69 at the desired flow rate.

The regeneration gas is circulated at a circulation rate through circulating line 76 of closed system 69 and passed over the deactivated SCR catalyst 58 to provide for its regeneration and to yield a regeneration effluent gas that contains SOx and ammonia. The regeneration effluent gas passes from SCR system 54 through downstream outlet 62 and is circulated through the closed system through circulation line 76.

In order to continuously remove regeneration products in the circulating regeneration effluent gas, a bleed or slip stream is removed from the circulating regeneration effluent by way of line 89 and is passed and introduced into line 24 where it is combined with the flue gas stream passing to acid gas removal unit 30. Processed flue gas is continuously introduced as a regeneration gas into the closed system through line 82 while a bleed stream of circulating regeneration effluent gas is simultaneously removed from the closed system through line 89.

Once a sufficient amount of activity is restored to the deactivated SCR catalyst 58, the regeneration is stopped by discontinuing the introduction of the processed flue gas through line 82 into the closed system and the removal of the regeneration effluent gas through line 84 from the closed system. The closed system is then reopened by opening both upstream damper 70 and downstream damper 74, by-passing of the processed flue gas stream around SCR system 54 through by-pass line 80 is stopped, and the processed flue gas stream is again passed to the SCR system 54 to be treated for the removal of nitrogen oxides to yield the denitrified flue gas stream that passes from SCR system 54 through line 66 to stack 68.

That which is claimed is:

1. A process for selective catalytic reduction of nitrogen oxides contained in a gas stream and regeneration of a deactivated catalyst, wherein the process comprises:

providing a processed flue gas stream, containing nitrogen oxides and sulfur compounds;

passing the processed flue gas stream to an SCR system, having an upstream inlet and a downstream outlet and containing an SCR catalyst, and contacting the processed flue gas stream with the SCR catalyst for a time sufficient to provide a deactivated SCR catalyst deactivated by sulfur compounds and yielding from the SCR system a denitrified flue gas stream for discharge into a stack;

discontinuing the step of passing the processed flue gas stream to the SCR system by isolating the SCR system to provide a closed system;

after filling the closed system with the processed flue gas, introducing at an introduction rate, a portion of the processed flue gas stream into the closed system as a regeneration gas used to regenerate the deactivated SCR catalyst to thereby regenerate the SCR catalyst and to yield a regeneration effluent gas containing SOx and ammonia while circulating at a circulating rate all or part of the regeneration effluent gas from the downstream outlet to the upstream inlet; and removing at a removal rate a portion of the regeneration effluent gas from the closed system while simultaneously introducing a portion of the processed flue gas stream into the closed system.

2. The process as recited in claim 1, comprising:

burning a combustible material within a furnace and yielding therefrom a flue gas stream, comprising nitrogen oxides, acid gas components, and particulates;

treating the flue gas stream by an acid gas removal unit to remove acid gas components from the flue gas stream and to yield a desulfurized flue gas stream; and removing particulates from the flue gas stream or the desulfurized flue gas stream by a particulate removal unit to yield the processed flue gas stream.

3. The process as recited in claim 2, comprising:

removing a portion of the nitrogen oxides in the flue gas stream by introducing either ammonia or urea or both into the furnace to induce selective non-catalytic reduction of the nitrogen oxides.

4. The process as recite in claim 2, comprising:

introducing the portion of the regeneration effluent gas either to the acid gas removal unit or to the particulate removal unit, or to both.

5. The process as recited in claim 4, comprising:

introducing heat energy into the regeneration effluent gas circulating within the closed system to thereby control a regeneration temperature of the regeneration gas.

6. The process as recited in claim 5, comprising:

measuring the introduction rate of the portion of the processed flue gas to provide a measured introduction rate and comparing the measured introduction rate against a desired introduction rate to provide a differential introduction rate; and adjusting the introduction rate of the portion of the processed flue gas stream in response to the differential introduction rate to maintain the introduction rate at the desired introduction rate.

7. The process as recited in claim 6, comprising:
measuring the removal rate of the portion of the regeneration effluent gas to provide a measured removal rate and comparing the measured removal rate against a desired removal rate to provide a differential removal rate; and adjusting the removal rate of the portion of the regeneration effluent gas in response to the differential removal rate to maintain the removal rate at the desired removal rate.

8. The process as recited in claim 7, comprising:
passing the processed flue gas stream around the closed system as a by-pass stream and passing the by-pass stream to the stack.

9. The process as recited in claim 8, comprising:
measuring the circulation rate of the regeneration gas to provide a measured circulation rate and comparing the measured circulation rate against a desired circulation rate to provide a differential circulation rate; and
adjusting the circulation rate in response to the differential circulation rate to maintain the circulation at the desired circulation rate.

10. The process as recited in claim 9, comprising: after the regeneration effluent gas has circulated for a circulation time sufficient to regenerate the deactivated SCR catalyst by restoring at least a portion of its reduced activity, ceasing the discontinuing, feeding, and removing steps; and continuing the passing step.

11. A process for selective catalytic reduction of nitrogen oxides contained in a gas stream and regeneration of a deactivated catalyst, wherein the process comprises:
treating the gas stream containing nitrogen oxide and sulfur compounds in a gas treatment unit configured to remove at least a portion of the sulfur compounds from the gas steam to generate a processed flue gas stream;
feeding the processed flue gas stream containing the nitrogen oxides and remaining portion of the sulfur compounds to an SCR system comprising an upstream inlet, a downstream outlet, and an SCR catalyst:
contacting the processed flue gas stream with the SCR catalyst for a time sufficient to provide a deactivated SCR catalyst deactivated by the sulfur compounds and yielding from the SCR system a denitrified flue gas stream;
discontinuing the step of feeding the processed flue gas stream to the SCR system by isolating the SCR system to provide a closed system;
regenerating the deactivated SCR catalyst, wherein the step of regenerating comprises:
feeding a regeneration gas into the closed system to yield a regeneration effluent gas containing SOx and ammonia;
circulating all or part of the regeneration effluent gas from the downstream outlet to the upstream inlet; and
removing a portion of the regeneration effluent gas from the closed system while simultaneously introducing a portion of the processed flue gas stream into the closed system.

12. The process as recited in claim 11, wherein the processed flue gas stream is used as the regeneration gas.

13. The process as recited in claim 11, comprising filling the closed system with the processed flue gas stream before feeding the regeneration gas into the closed system.

14. The process as recited in claim 11, comprising introducing heat energy into the regeneration effluent gas circulating within the closed system.

15. The process as recited in claim 11, comprising passing the processed flue gas stream around the closed system as a by-pass stream and directing the by-pass stream to a stack.

16. The process as recited in claim 11, comprising feeding the portion of the regeneration effluent gas to the gas treatment unit, wherein the gas treatment unit comprises an acid gas removal unit, a particulate removal unit, or both.

17. A process for selective catalytic reduction of nitrogen oxides contained in a gas stream and regeneration of a deactivated catalyst, wherein the process comprises:
feeding a processed flue gas stream containing nitrogen oxides and sulfur compounds to an SCR system comprising an upstream inlet, a downstream outlet, and an SCR catalyst:
contacting the processed flue gas stream with the SCR catalyst for a time sufficient to provide a deactivated SCR catalyst deactivated by the sulfur compounds to generate a denitrified flue gas stream; and
regenerating the deactivated SCR catalyst, wherein the regenerating step comprises:
blocking flow communication to and from the SCR system to provide a closed system;
introducing a regeneration gas into the closed system to regenerate the deactivated SCR catalyst and to yield a regeneration effluent gas containing SOx and ammonia while circulating all or part of the regeneration effluent gas from the downstream outlet to the upstream inlet; and
removing a portion of the regeneration effluent gas from the closed system while simultaneously introducing a portion of the processed flue gas stream into the closed system.

18. The process as recited in claim 17, wherein the processed flue gas stream is the regeneration gas.

19. The process as recited in claim 17, comprising introducing heat energy into the regeneration effluent gas circulating within the closed system.

20. The process as recited in claim 17, comprising feeding the portion of the regeneration effluent gas to a gas treatment unit disposed upstream of the SCR system and configured to generate the processed flue gas, wherein the gas treatment unit comprises an acid gas removal unit, a particulate removal unit, or both.

* * * * *